(12) United States Patent
Jeong (10) Patent No.: US 10,554,949 B2
(45) Date of Patent: Feb. 4, 2020

(54) CAMERA MODULE AND MOBILE TERMINAL INCLUDING SAME

(71) Applicant: LG Innotek Co., Ltd., Seoul (KR)

(72) Inventor: Seong Cheol Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 94 days.

(21) Appl. No.: 15/315,292

(22) PCT Filed: May 20, 2015

(86) PCT No.: PCT/KR2015/005039
§ 371 (c)(1),
(2) Date: Nov. 30, 2016

(87) PCT Pub. No.: WO2015/190717
PCT Pub. Date: Dec. 17, 2015

(65) Prior Publication Data
US 2017/0201737 A1 Jul. 13, 2017

(30) Foreign Application Priority Data

Jun. 9, 2014 (KR) .................... 10-2014-0069094
Jun. 11, 2014 (KR) .................... 10-2014-0070518

(51) Int. Cl.
*G03B 11/00* (2006.01)
*H04N 5/225* (2006.01)
(Continued)

(52) U.S. Cl.
CPC ........... *H04N 13/221* (2018.05); *G03B 11/00* (2013.01); *H04N 5/2254* (2013.01);
(Continued)

(58) Field of Classification Search
CPC .. H04N 13/221; H04N 13/296; H04N 5/2254; H04N 13/0221; H04N 13/0296;
(Continued)

(56) References Cited

U.S. PATENT DOCUMENTS

2004/0160679 A1* 8/2004 Nomura ................ G02B 7/102
359/701
2010/0316282 A1* 12/2010 Hope ...................... G06T 7/55
382/154

(Continued)

FOREIGN PATENT DOCUMENTS

CN 102012625 A 4/2011
CN 102645815 A 8/2012
(Continued)

OTHER PUBLICATIONS

International Search Report in International Application No. PCT/KR2015/005039, filed May 20, 2015.
(Continued)

*Primary Examiner* — Thai Q Tran
*Assistant Examiner* — Nienru Yang
(74) *Attorney, Agent, or Firm* — Saliwanchik, Lloyd & Eisenschenk (57) ABSTRACT

A camera module is disclosed. A device according to an embodiment of the present invention can move a bobbin in a first direction perpendicular to an optical axis by applying a first predetermined current to a driving unit, and move the bobbin in as second direction perpendicular to the optical axis by applying a second predetermined second current to the driving unit.

9 Claims, 7 Drawing Sheets

(51) Int. Cl.
*G02B 5/20* (2006.01)
*G02B 7/00* (2006.01)
*H04N 13/221* (2018.01)
*H04N 13/296* (2018.01)

(52) U.S. Cl.
CPC ........... *H04N 13/296* (2018.05); *G02B 5/208* (2013.01); *G02B 7/006* (2013.01); *H04N 2213/001* (2013.01)

(58) Field of Classification Search
CPC .. H04N 2213/001; G02B 5/208; G02B 7/006; G03B 11/00
USPC .......................................................... 348/50
See application file for complete search history.

(56) References Cited

U.S. PATENT DOCUMENTS

| | | | | |
|---|---|---|---|---|
| 2012/0082442 | A1* | 4/2012 | Kwon | G02B 27/646 396/55 |
| 2013/0107017 | A1* | 5/2013 | Endo | G03B 7/08 348/49 |
| 2014/0036146 | A1* | 2/2014 | Choi | H04N 5/2254 348/374 |
| 2014/0092298 | A1* | 4/2014 | Kim | H04N 5/2254 348/374 |
| 2014/0132738 | A1* | 5/2014 | Ogura | H04N 5/23287 348/47 |

FOREIGN PATENT DOCUMENTS

| | | |
|---|---|---|
| CN | 102959467 A | 3/2013 |
| CN | 103384342 A | 11/2013 |
| JP | 2012128251 A | 7/2012 |
| KR | 20120004090 A | 1/2012 |
| KR | 20130047343 A | 5/2013 |
| KR | 20140000723 A | 1/2014 |
| KR | 20140011850 A | 1/2014 |

OTHER PUBLICATIONS

Office Action dated Mar. 8, 2018 in Chinese Application No. 201580030415.6.

* cited by examiner

CAMERA MODULE AND MOBILE TERMINAL INCLUDING SAME

CROSS-REFERENCE TO RELATED APPLICATIONS

This application is the U.S. national stage application of International Patent Application No. PCT/KR2015/005039, filed May 20, 2015, which claims priority to Korean Application Nos. 10-2014-0069094, filed Jun. 9, 2014, and 10-2014-0070518, filed Jun. 11, 2014, the disclosures of each of which are incorporated herein by reference in their entirety.

TECHNICAL FIELD

The present invention relates to a camera module and a mobile terminal having the camera module.

BACKGROUND ART

As is well known, a man's vision (sight) is one of the senses to obtain information on surrounding environments, and can recognize through two eyes position, distance and nearness of an object. That is, visual information introduced through two eyes is synthesized in one distance information. What is used when the visual structure is realized by a machine is a 3D (three dimensional) image processing system. In general, the 3D image processing system can generate a 3D image by synthesizing images obtained by using two cameras (stereo cameras).

Recently, even small electronic products such as smart phones are provided with stereo cameras in order to generate and display 3D images.

Figure 1:
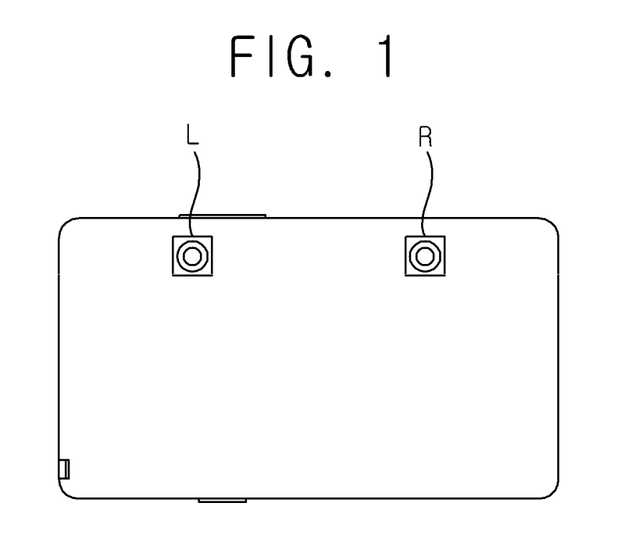
FIG. 1 is an exemplary view illustrating a stereo camera provided to a mobile terminal.

FIG. 1 is an exemplary view illustrating a stereo camera provided with a mobile terminal. Referring to FIG. 1, one side of a housing at a mobile terminal is provided with stereo camera (L, R), and images inputted through the stereo cameras (L, R) are synthesized by a controller (not shown) of the mobile terminal to generate a 3D image.

However, the 3D image processing system in a mobile terminal according to the prior art can generate a 3D image, only when the mobile terminal is disposed in a width direction, and a 3D image cannot be generated when the mobile terminal is rotated to 90° in a state of FIG. 1, whereby a lengthwise 3D image cannot be realized, resulting in narrowness of a generated width of a 3D image.

Furthermore, two camera modules are disadvantageously required in order to build a stereo system in the conventional mobile terminal as illustrated in FIG. 1 to thereby increase the costs.

Meantime, a small camera module mounted on a mobile device such as a tablet PC or a smart phone includes a PCB (Printed Circuit Board) mounted with an image sensor, a lens barrel mounted with a plurality of lenses, and an actuator having an AF (Auto Focusing) and/or handshake correction functions, and an UV shield filter for removing UV components from an image captured on an image sensor is mounted on a light path. The UV shield filter is fixed to a filter accommodation unit formed on a base member or a holder member spaced apart from the image sensor at a predetermined distance, using an adhesive member.

However, if a holder member is slanted even to a slightest level when an alignment of center axis between the holder member and the lens barrel is implemented during a process of assembling the lens barrel and the holder member, there is no way but to assemble the lens barrel in a slanted state altogether. Particularly, because there is generated almost no allowance between the lens barrel and the holder member, and when the slanted optical axis is assembled along with the image sensor in a tilted state, there may be generated a cumbersomeness in order to separately perform an additional alignment operation due to alignment deficiency.

DETAILED DESCRIPTION OF THE INVENTION

Technical Subject

The technical subject to be solved by the present invention is to provide a camera module generating a 3D image using a single camera, and a mobile terminal having the camera module.

Another technical subject to be solved by the present invention is to provide a camera module improved in structure in order to enhance a height tilt with the lens barrel and the actuator and a centering accuracy using an accurate processing jig and a mobile terminal having the camera module.

Technical Solution

In one general aspect of the present invention, there is provided a camera module, the camera module comprising:
a bobbin disposed therein with a lens;
a driving part moving the bobbin;
an image sensor disposed at a bottom surface of the bobbin;
a controller moving the bobbin to a first direction perpendicular to an optical axis by applying a predetermined first current to the driving part, and moving the bobbin to a second direction perpendicular to the optical axis by applying a predetermined second current to the driving part; and
a generation part generating a 3D image from a first displacement image and a second displacement image obtained from movement of the bobbin.

Preferably, but not necessarily, the second direction may be a direction opposite to the first direction.

Preferably, but not necessarily, the controller may store a magnitude of the first current and a magnitude of the second current by predetermining the magnitude of the first current and the magnitude of the second current.

Preferably, but not necessarily, the controller may determine the magnitudes of the first and second currents based on a distance between a photographing subject and the lens.

Preferably, but not necessarily, a moving distance of bobbin may be determined by magnitudes of the first and second currents.

Preferably, but not necessarily, the driving part may be a coil block disposed at a periphery of the bobbin.

In another general aspect of the present invention, there is provided a camera module, the camera module comprising:
a PCB mounted with an image sensor;
a base coupled with the PCB (Printed Circuit Board), with a window of a predetermined area at the center, in which window an infrared cut-off filter is mounted;
a holder member coupled to the base using an adhesive member;
a lens barrel including at least one lens and insertedly coupled to the holder member; and
a guide lug protrusively formed at a periphery of the lens barrel to guide an insertion path of the lens barrel, wherein the guide lug is spaced apart from an inner surface of the holder member at a first distance, and the periphery of the lens barrel is spaced apart from the inner surface of the holder member at a second distance greater than the first distance.

Preferably, but not necessarily, the lens barrel is disposed to allow it to be fine-spinnable around a point (G) crossed by an imaginary line passing a center of the guide lug and an optical axis.

Preferably, but not necessarily, the first distance may be formed within 0.2 mm.

Preferably, but not necessarily, the lens barrel may be fixed to the holder member using an adhesive.

Preferably, but not necessarily, the distal end of the guide lug may be flatly, roundly, or pointedly formed.

Preferably, but not necessarily, the distal end of the guide lug may be spaced apart from an inner surface of the holder member.

Preferably, but not necessarily, the guide lug may be disposed at a position near to an upper end of the lens barrel to allow a distance from a bottom end of the lens barrel to the guide lug to be formed longer than a distance from the upper end of the lens barrel to the lens barrel.

Preferably, but not necessarily, the lens module may be fixedly coupled to the holder member after being insertedly coupled to the holder member placed on a flatness-aligned jig.

Preferably, but not necessarily, the lens module may be formed in a shape of a cylinder and a periphery thereof is protrusively and continuously formed with ring-shaped guide lugs.

In still another aspect of the present invention, there is provided a mobile terminal including a camera module.

Preferably, but not necessarily, the controller may determine a first direction and a second direction of the bobbin by ascertaining a direction of the mobile terminal.

Advantageous Effects of the Invention

The present invention can advantageously generate a 3D image using a single camera module, and can also generate a 3D image regardless of a direction of an electronic product disposed with a camera module photographing an image.

Another advantageous effect is that a correction operation can be additionally implemented for improvement in centering accuracy after assembly by assembling a lens barrel on an actuator about a lug guide through formation of the lug guide at a periphery of the lens barrel to allow the lens barrel to rotate about the lug guide.

BEST MODE

Reference will now be made in detail to embodiments, examples of which are illustrated in the accompanying drawings. In the following detailed description, numerous specific details are set forth in order to provide a thorough understanding of the present disclosure. However, this disclosure may be embodied in many different forms and should not be construed as limited to any specific structure or function presented throughout this disclosure. Thus, the disclosure described herein is intended to embrace all such alternatives, modifications, variations and applications as may fall within the spirit and scope of the appended claims.

Now, exemplary embodiments of the present invention will be described in detail with reference to the accompanying drawings.

Figure 2:
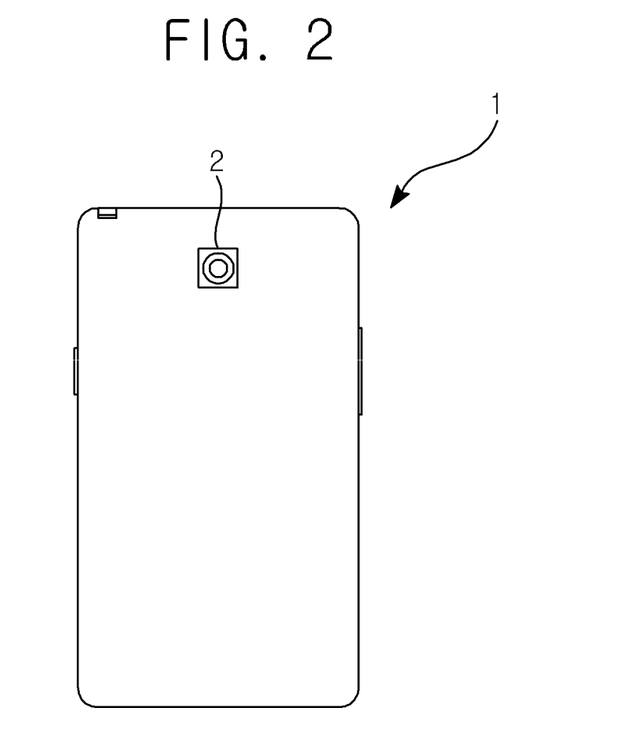
FIG. 2 is an exemplary view illustrating a mobile terminal according to an exemplary embodiment of the present invention.

FIG. 2 is an exemplary view illustrating a mobile terminal according to an exemplary embodiment of the present invention.

Referring to FIG. 2, a camera module (2) according to the present invention may be applied to a mobile terminal (1) and may receive an image by being disposed at a bottom surface of the mobile terminal (1).

Although the exemplary embodiment of the present invention has described an example in which a camera module is applied to a mobile terminal (1) as shown in FIG. 2, the present invention is not limited thereto, and may be applied to various electronic products such as smart televisions and the like.

Furthermore, although the exemplary embodiment of the present invention has exemplified a smart phone as a mobile terminal (1), the present invention is not limited thereto, and the mobile terminal may include various types of mobile terminals that may be mounted with a camera module (2) such as a portable phone and a smart pad.

Figure 3:
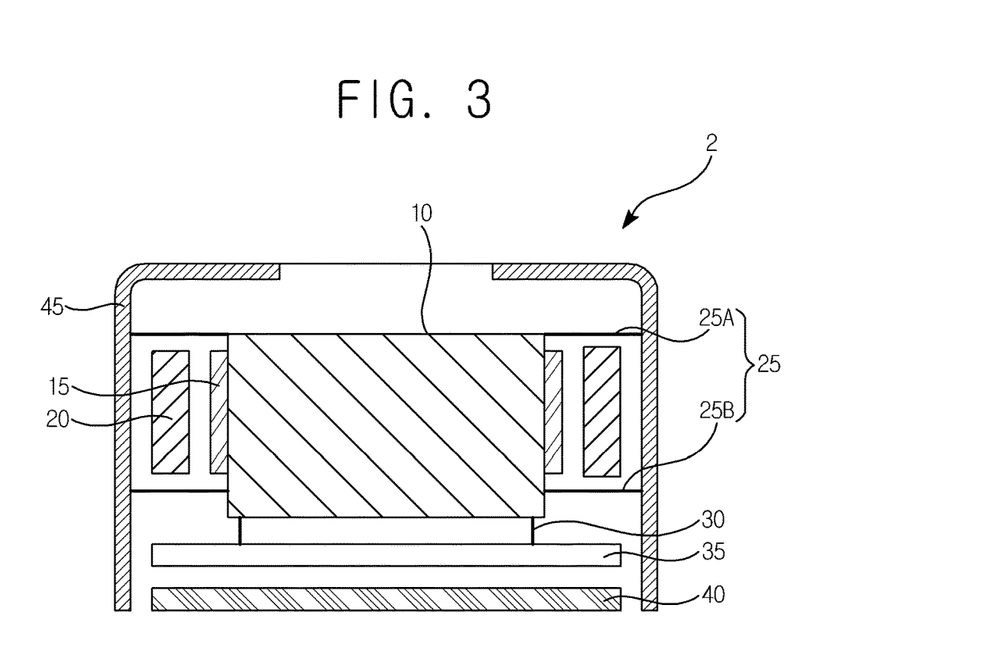
FIG. 3 is a schematic view illustrating a camera module according to an exemplary embodiment of the present invention.

FIG. 3 is a schematic view illustrating a camera module (2) according to an exemplary embodiment of the present invention.

Referring to FIG. 3, a bobbin (10), disposed with at least one lens therein in the camera module (2) according to an exemplary embodiment of the present invention, is disposed at an interior of a cover (45), wherein the bobbin (10) may be disposed at a periphery thereof with a coil block (15), and a magnet (20) may be formed at a position opposite to that of the coil block (15). However, this configuration is provided just for an exemplary purpose, such that a magnet may be disposed at a periphery of the bobbin, and a coil block may be formed at a position opposite to that of the magnet.

The bobbin (10) may be supported by an upper elastic member (25A) and a bottom elastic member (25B). However, this configuration is provided just for an exemplary purpose, such that the bobbin (10) may be formed only at any one of the upper elastic member or the bottom elastic member. When a current is applied to any one of the upper elastic member (25A) or the bottom elastic member (25B), the bobbin (10) may implement an auto focusing performance by moving to an optical axis direction.

Furthermore, the bobbin (10) may be connected to an interface pad (35) by a connection member (30). The bobbin (10) may move to a direction perpendicular to the optical axis to perform an OIS (Optical Image Stabilization) in response to a current applied to the coil block (15) through the interface pad (35).

The OIS is a function to prevent an outline of a photographed image from being unclearly formed that is caused by vibration from handshake of a user during photographing of a still image, where the bobbin (10) is moved to a direction perpendicular to an optical axis by a current applied from outside.

Furthermore, the bobbin (10) may be disposed at a bottom side thereof with an image sensor part (40). The image sensor (40) may convert an optical signal to an image signal from a pixel of active area in response to a lens coupled to an interior of the bobbin (10). The image sensor part (40) may include a CCD (Charge Coupled Device), a CMOS (Complementary Metal-Oxide Semiconductor) and the like. The present invention however is not limited thereto, and therefore, the image sensor part (40) may include other elements performing similar functions.

In addition, the elements thus described for the camera module (2) according to the exemplary embodiment of the present invention are not limited thereto, and various other elements may be included, and elements having little bearing with the present invention will be omitted in explanation.

The camera module (2) according to an exemplary embodiment of the present invention may be configured such that the bobbin (10) is moved to a direction perpendicular to the optical axis by a current applied to the coil block (15), whereby binocular parallax (disparity) can be formed.

Figure 4:
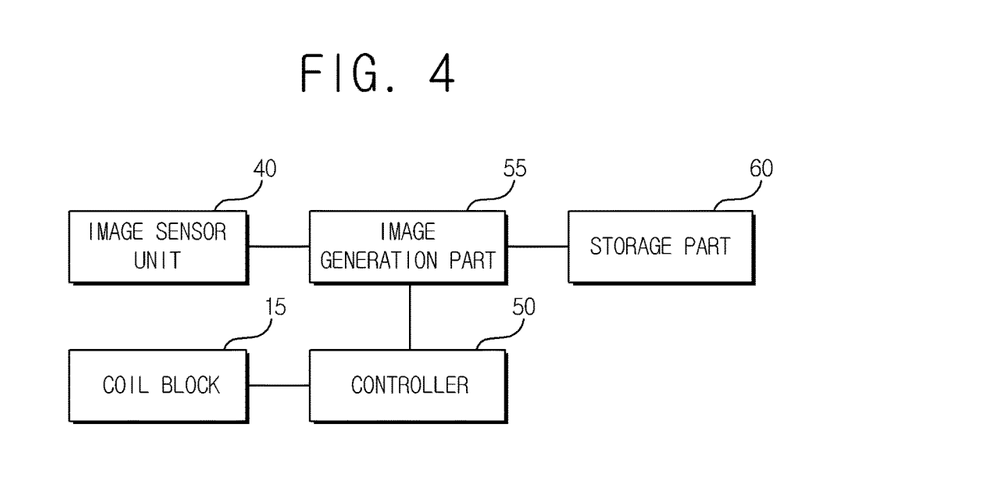
FIG. 4 is an exemplary view illustrating a 3D image generation device according to an exemplary embodiment of the present invention.
Figure 5A:
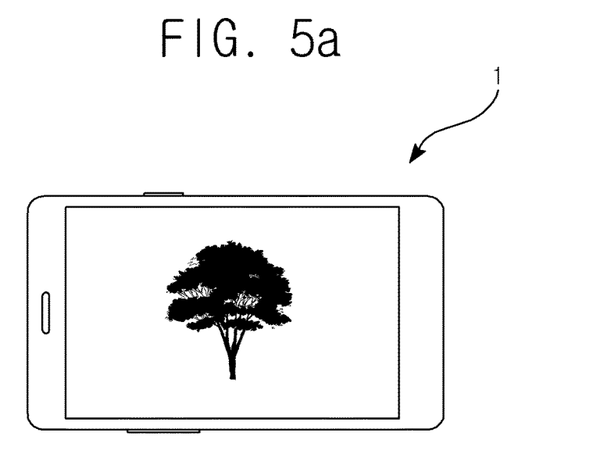
FIGS. 5a, 5b and 5c are exemplary views illustrating an image obtained by the 3D image generation device according to an exemplary embodiment of the present invention.
Figure 5B:
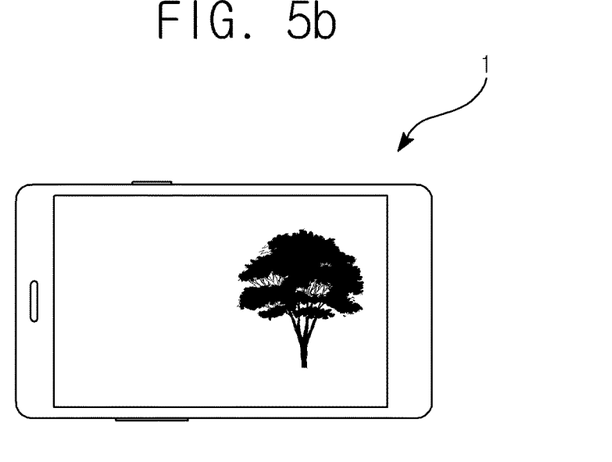
Figure 5C:
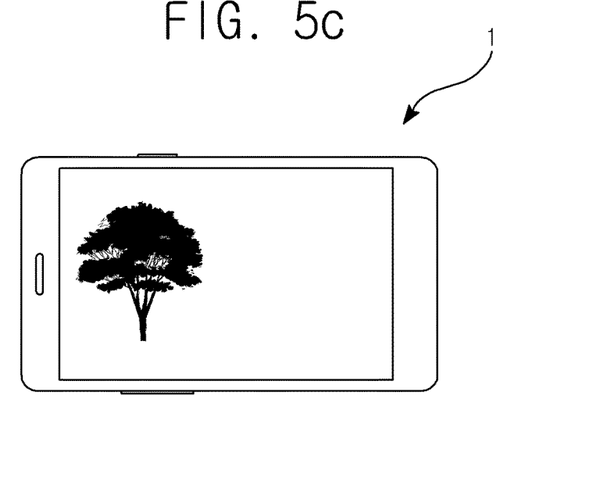

FIG. 4 is an exemplary view illustrating a camera module according to an exemplary embodiment of the present invention, and FIGS. 5a, 5b and 5c are exemplary views illustrating an image obtained by the camera module according to an exemplary embodiment of the present invention.

As illustrated in the drawings, the camera module according to the present invention may include a controller (50), an image generation part (55) and a storage part (60).

The controller (50) may apply a predetermined first current to the coil block (15) when a user generates a 3D image, to move the bobbin (10) to a first direction perpendicular to the optical axis. For example, the bobbin (10) may be moved to the left side by the first current from the controller (50).

FIG. 5a illustrates an image obtained from the image sensor part (40), when the bobbin (10) is disposed at an initial position, FIG. 5b illustrates an image obtained through the image sensor part (40) when the bobbin (10) is moved to the left side, and FIG. 5c illustrates an example of an image obtained through the image sensor part (40) when the bobbin (10) is moved to the right side.

When the image sensor part (40) obtains an image as in FIG. 5a at an initial position of the bobbin (10), and when the controller (50) applies a first current to the coil block (15), the bobbin (10) may move to the left side relative to the initial position at a predetermined gap, whereby an image obtained by the image sensor part (40) can generate a displacement to the right side relative to the image of the initial position as shown in FIG. 5b. Hereinafter, an image as in FIG. 5b is called 'first displacement image'.

The image generation part (55) may store a first displacement image in a storage part (60) by receiving the first displacement image as in FIG. 5b from the image sensor part (40).

The magnitude of first current applied by the controller (50) may be predetermined, and may be determined by the controller (50) based on a distance between a photograph subject and a lens of the camera module (2). A distance of the bobbin (10) may be determined by the magnitude of current applied to the coil block (15).

Furthermore the controller (50) may move the bobbin (10) to a second direction perpendicular to the optical axis and opposite to the first direction by applying a second current to the coil block (15) after obtaining the first displacement image as discussed above. For example, the bobbin (10) may be moved to the right side by a second current from the controller (50).

When the controller (50) applies a second current to the coil block (15), the bobbin (10) may be moved to the right side from the initial position as much as a predetermined gap, whereby the image obtained by the image sensor part (40) may generate a displacement to the left side relative to the image at the initial position as illustrated in FIG. 5c. Hereinafter, the image as in FIG. 5c is called 'a second displacement image'.

The image generation part (55) may store a second displacement image as in FIG. 5c by receiving the second displacement image from the image sensor part (40).

The magnitude of the second current applied by the controller (50) may be predetermined, and may be determined by the controller (50) based on a distance between a photograph subject and a lens of the camera module (2). A moving distance of the bobbin (10) may be determined by the magnitude of current applied to the coil block (15) as explained supra.

Thereafter, the image generation part (55) may synthesize the first and second displacement images stored in the storage part (60) to generate a 3D image. The method of generating a 3D image by the image generation part (55) may be a stereo matching method, for example, but the present invention is not limited thereto and other various methods may generate a 3D image.

Although the exemplary embodiment of the present invention has limited in explanation to a case where the controller (50) applies a current to the coil block (15), the present invention is not limited thereto, and it should be apparent to the skilled in the art that a current is applied to various elements configured to drive the bobbin (10) in addition to the coil block (15) in order to drive the bobbin (10). As discussed supra, a 3D image can be generated by a single camera module according to an exemplary embodiment of the present invention.

Meantime, it is impossible to photograph a 3D image by holding a mobile terminal in a longitudinal way using the conventional stereo camera as illustrated in FIG. 1. However, a 3D image can be photographed according to the present invention even when a mobile terminal is disposed in longitudinal manner.

Figure 6A:
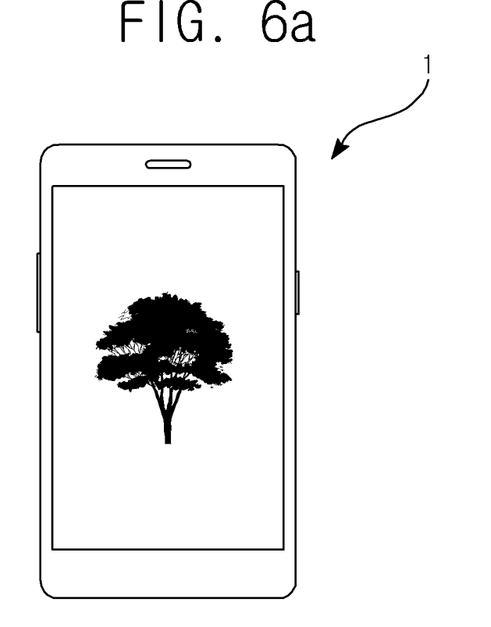
FIGS. 6a, 6b and 6c are other exemplary views illustrating an image obtained by the 3D image generation device according to an exemplary embodiment of the present invention.
Figure 6B:
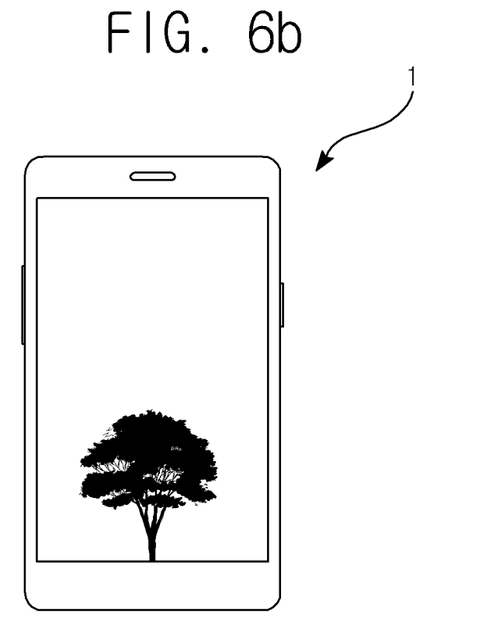
Figure 6C:
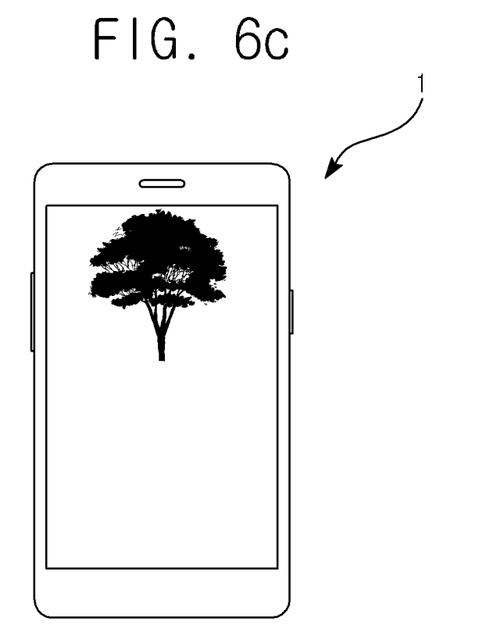

FIGS. 6a, 6b and 6c are other exemplary views illustrating an image obtained by the 3D image generation device according to an exemplary embodiment of the present invention.

A user may select photographing of a 3D image from a menu area, which is a well-known art to the skilled in the art, such that no further elaboration thereto will be made.

When a user photographs a 3D image, the controller (50) may ascertain a direction of the mobile terminal (1) to thereby determine a moving direction of the bobbin (10). At this time, the controller (50) may ascertain a direction of the mobile terminal (1) by a data from a sensor (not shown in the Fig.) provided to the mobile terminal (1), and also ascertain a direction of the mobile terminal (1) by checking an image obtained by the image sensor part (40). However, the present invention is not limited thereto.

Because an image is photographed by the mobile terminal (1) in a widthwise state according to an exemplary embodiment of FIGS. 5a and 5b, the first direction corresponded to the left side, and the second direction corresponded to the right side. However, an image is photographed by the mobile terminal (1) in a longitudinal state according to an exemplary embodiment of FIGS. 6a, 6b and 6c, the first direction may correspond to the upward side, and the second direction may correspond to the downward side. However, this is an example, and a direction to which the bobbin (10) moves may be determined by various methods according to various exemplary embodiments.

The controller (50) may move the bobbin (10) to the first direction which is perpecdicular to the optical axis by applying a predetermined first current to the coil block (15). That is, the bobbin (10) can move upwards by the first current of the controller (50).

When the image sensor part (40) can obtain an image as in FIG. 6a at an initial position of bobbin (10), and bobbin (10) can move upwards relative to the initial position as much as a predetermined distance when the controller (50) applies a first current to the coil block (15), whereby the image sensor part (40) may generate a first displacement image that has moved downwards relative to an image of initial position as in FIG. 6b.

The image generation part (55) may store the first displacement image in the storage part (60) by receiving the first displacement image as in FIG. 6b from the image sensor part (40).

Furthermore, the controller (50) may move the bobbin (10) to the second direction perpendicular to the optical axis and opposite to the first direction by applying a second current to the coil block (15) after obtaining the first displacement image. For example, the bobbin (10) may be moved downwards by the second current from the controller (50).

When the controller (50) applies a second current to the coil block (15), the bobbin (10) may be moved downwards relative to the initial position as much as a predetermined distance, whereby the image sensor part (40) may generate a second displacement image that has moved upwards relative to an image of initial position as in FIG. 6c.

The image generation part (55) may store the second displacement image as in FIG. 6c in the storage part (60) by receiving the second displacement image from the image sensor part (40).

Subsequently, the image generation part (55) may generate a 3D image by synthesizing the first and second displacement images stored in the storage part (60).

As discussed supra, 3D image generation device according to an exemplary embodiment of the present invention may generate 3D images of various angles, regardless of the photographing direction of the mobile terminal.

Figure 7:
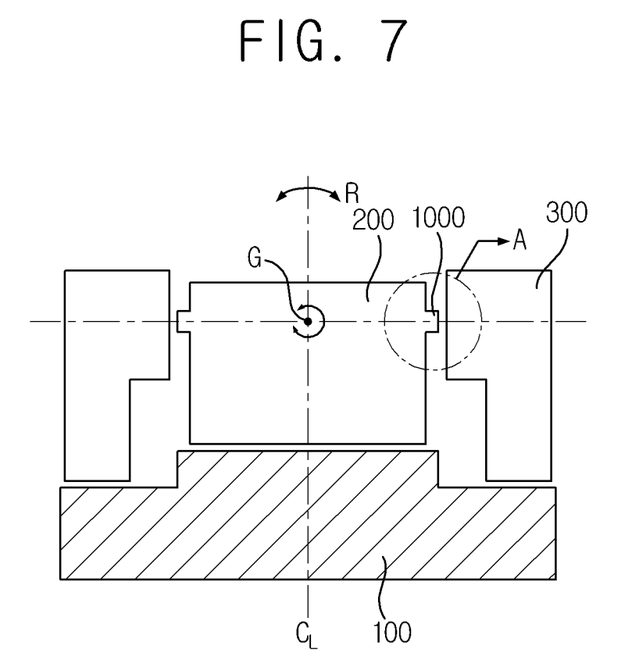
FIG. 7 is a schematic view illustrating an assembly process of a camera module according to an exemplary embodiment of the present invention.
Figure 8:
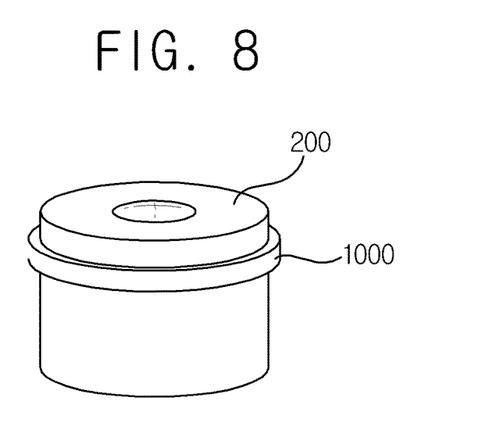
FIG. 8 is a perspective view illustrating a lens barrel.
Figure 9:
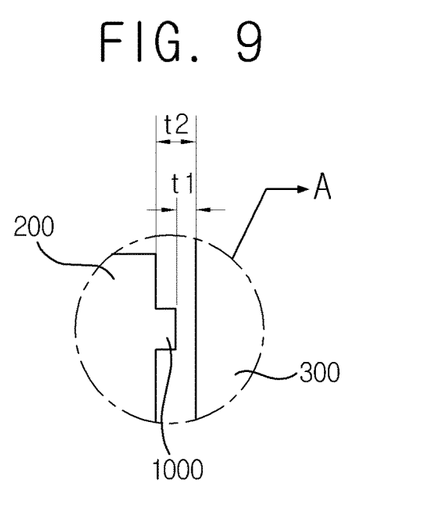
FIGS. 9 to 11 are schematic views illustrating a shape of a guide lug according to a first to third exemplary embodiments of the present invention.
Figure 10:
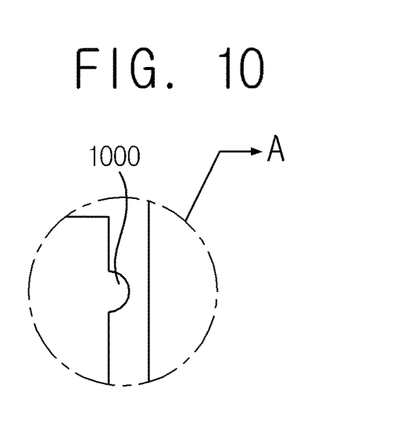
Figure 11:
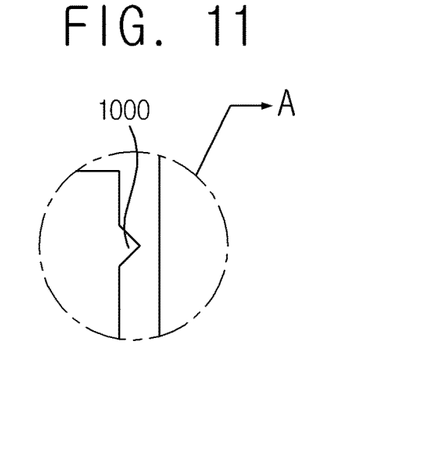
Figure 12:
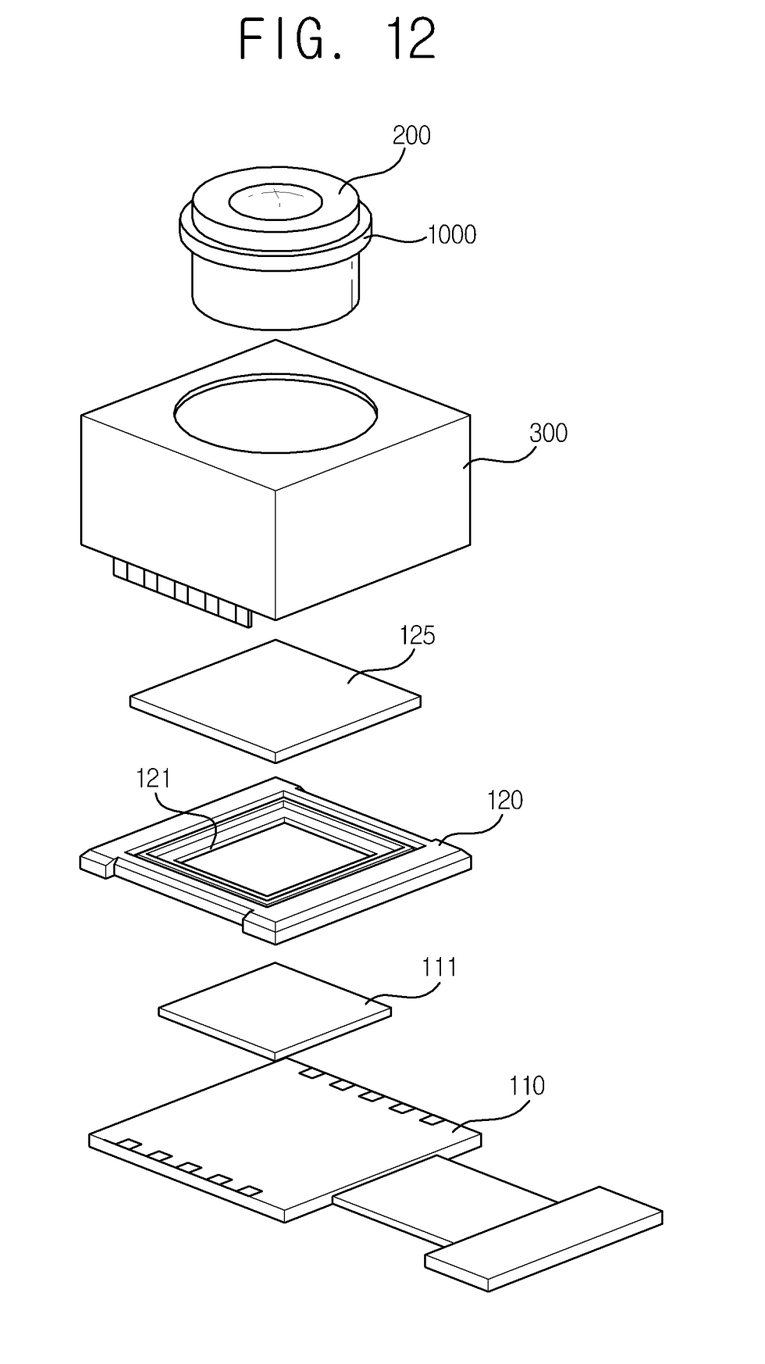
FIG. 12 is an exploded perspective view illustrating a camera module according to an exemplary embodiment of the present invention.

FIG. 7 is a schematic view illustrating an assembly process of a camera module according to an exemplary embodiment of the present invention, FIG. 8 is a perspective view illustrating a lens barrel, FIGS. 9 to 11 are schematic views illustrating a shape of a guide lug according to a first to third exemplary embodiments of the present invention, and FIG. 12 is an exploded perspective view illustrating a camera module according to an exemplary embodiment of the present invention.

Referring to FIGS. 7 and 12, a camera module according an exemplary embodiment of the present invention may include a PCB (Printed Circuit Board, 110), a base (120), a lens barrel (200) and a holder member (300).

The PCB (110) may be mounted with an image sensor (111) having an effective image region of a predetermined area. The image sensor (111) may be provided with an approximately rectangular shape with an effective image region of a predetermined area.

The base (120), as illustrated in FIG. 12, may be disposed at an upper side of the PCB (110), and may be fixed by adhesive member such as epoxy. The base (120) may be formed at a center thereof with a window (121) having an area greater than that of the effective image region of the image sensor (111), where a barrier member is protruded from a circumference of the window (121) to shield the overflow of adhesive member coated for active alignment, and also shield the inflow of various outside lights to the window side.

An accommodation part may be provided mountable with an infrared cut-off filter (125) at an upper surface near to a center of the base (120), and according to an exemplary embodiment of the present invention, the barrier member may be protrusively formed at a circumference of the accommodation part in addition thereto. At this time, a height of the barrier member may be formed higher than thickness of the infrared cut-off filter (125) to thereby prevent the overflow of the adhesive member from being transmitted to the infrared cut-off filter (125).

The window (121) may be formed at a vicinity to a center of the base (120), where the window (121) may be formed greater than the effective image region of the image sensor (111), and the window (121) may generally have an inner circumferential surface having a predetermined area due to the thickness of the base (120).

At this time, various lights reflected from the inner circumferential surface may generate an image error such as a flare by being transmitted to the image sensor (111).

Meantime, as illustrated in FIG. 12, an adhesive member (not shown in the Fig.) for active alignment may be coated at an upper surface of the base (120) mounted with the holder member (300) to have a predetermined height with an area coupled with the holder member (300).

As illustrated in FIGS. 7 and 9, the holder member (300) may include therein at least one lens barrel (200). At this time, the lens barrel (200) may be fixedly coupled by using an adhesive after being inserted into the holder member (300). Furthermore, it may be a more effective configuration that the lens barrel (200) is formed with a guide lug (described later, 1000), when the lens barrel (200) is not the type formed with a screw thread at a periphery thereof, and when the lens barrel (200) is the type formed with a screw thread, the guide lug (3000, described later) may be formed at a partial section where no screw thread is formed.

The holder member (300) may be mounted with an actuator (not shown), or the holder member (300) itself may be an actuator, and the actuator may perform the AF and/or handshake correction operations of focus captured on the image sensor (111), where the actuator may be provided at an inner side of the holder member (300) with a VCM (Voice Coil Motor), and it may be possible that the handshake correction and AF functions are performed by moving one sheet of lens as a lens moving method.

Meantime, the camera module according to an exemplary embodiment of the present invention, the base (120) and the holder member (300) may be fixedly coupled by using an adhesive as discussed supra, and at this time, the lens barrel (200) and the holder member (300) may be provided in an assembly shape by being coupled in advance as illustrated in FIG. 7.

To this end, as illustrated in FIG. 7, the holder member (300) may be placed at an upper surface of a jig (100) first, and then the lens barrel (200) is insertedly coupled to the holder member (300) according to an exemplary embodiment.

At this time the upper surface of the jig (100) may be provided with the flatness being matched, and the holder member (300) disposed thereon may be also placed with the flatness being matched.

Meantime, the holder member (300) may be provided at a center thereof with a through hole to insert the lens barrel (200), and a guide lug (1000) with a size corresponding to the size of an inner surface of the through hole may be protrusively formed at a periphery of the lens barrel (200).

The guide lug (1000), as illustrated in FIG. 8, may be protrusively formed on a periphery of the lens barrel (200) to have a predetermined height, and may be protruded in a ring-shape on an entire peripheral surface of the lens barrel (200) with a predetermined height. However, the guide lug is not limited thereto, and it may be possible that the guide lug is formed with a plurality of lugs to be protruded from the periphery, or may be also intermittently formed.

The guide lug (1000), as illustrated in FIG. 9, may be spaced apart from the inner surface of the through hole in the lens barrel (300) at a first distance (t1), where the first distance (t1) may be formed shorter than a second distance (t2) between the peripheral surface of the lens barrel (200) and the inner surface of the through hole, and where the distance may be formed not to be beyond 0.2 mm.

Meanwhile the guide lug (1000) may be formed with a distal end with a flat surface as illustrated in FIG. 9, and may be roundly formed as illustrated in FIG. 10, and may be pointedly formed as illustrated in FIG. 11. However, the shape of guide lug is not limited thereto, and it may suffice as long as a protruded part is formed at the periphery of the lens barrel (200). That is, the guide lug (1000) may be a protruded part.

Furthermore, the guide lug (1000) may be disposed at a position near to an upper end of the lens barrel (200), such that a distance of the guide lug (1000) from a bottom end of the lens barrel (200) is formed longer than a distance of the guide lug (1000) from the upper end of the lens barrel (200).

On the other hands, when the holder member (300) is a bit twisted from a state of being placed on the jig (100) during the process thus discussed, the lens barrel (200) may be also inserted in a twisted state to thereby twist the alignment of a center line (CL).

In this case, as illustrated in FIG. 7, the center can be aligned by fine-rotation about a point (G) where an imaginary line passing a center of the guide lug (1000) and an optical axis cross each other. That is, as mentioned above, the guide lug (1000) is not completely attached to the inner surface of the through hole, such that the lens barrel (200) can be finely rotated about the point (G) as shown in the arrow. When the center alignment is performed as discussed above, even if the lens barrel (200) is insertedly coupled while the holder member (300) is in a bit twisted state, a fixed coupling can be implemented by performing the center alignment by rotating the lens barrel (200) prior to complete fixation using an adhesive. Furthermore, the guide lug (1000) itself can reduce the tilt amount to thereby solve the problem that may be generated during the center alignment about the optical axis even if the lens barrel (200) is not separately rotated.

When the lens barrel (200) is assembled to the holder member (300) as mentioned supra, which is then fixedly coupled with the base (120) using an adhesive.

Furthermore, the lens barrel (200) and the actuator can perform an operation such as the optical axis alignment relative to the image sensor (111), and recently, the optical axis position adjustment is also performed through an AA (Active Alignment) for the optical axis alignment. The AA is generally performed in a manner such that the holder member (300) mounted with the optical axis-aligned lens barrel (200) is fixed to the base (120) by irradiating a heat or a light of particular wavelength such as ultraviolet to the adhesive including epoxy.

In addition, the above mentioned exemplary embodiment can be mounted on mobile devices, digital devices or mobile phones.

Albeit not being illustrated, it may also be possible that an actuator part configured to perform the AF and/or handshake correction function is additionally mounted at an upper surface of the lens barrel (200).

That is, the actuator part may be disposed at an upper surface of the lens barrel (200) to perform the AF and handshake correction functions. The actuator part may be applied with any configuration as long as a focus can be adjusted by changing a refractive index of an optical member such as an MEMS actuator, a curvature-changing optical member and a liquid lens. The actuator part may be equipped with at least two electrodes for control of refractive index.

Albeit not being illustrated, the actuator part may take a substantially square shape, but the present invention is not limited thereto and various shapes of configurations may be applied thereto if necessary.

The electrodes may be conductively connected to the PCB (110) in order to control the actuator part. The electrodes and a terminal (not shown) of the PCB may be variably connected, and the exemplary embodiment of the present invention shows a configuration in which conductive connection is implemented using a conductive pattern formed at an upper surface of the lens barrel (200) and a wiring member, for example. The electrodes may be conductively connected using any one of the conductive pattern, a soldering, a conductive adhesive and an Ag dot.

According to the exemplary embodiments thus mentioned, a fixed coupling can be implemented by performing a center alignment of the holder member (300) and the lens barrel (200) more accurately during the assembly process of camera module in an active alignment method, whereby the degree of precision (accuracy) on parts can be enhanced.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A camera module, the camera module comprising:
   a bobbin disposed therein with a lens;
   a driving part configured to move the bobbin;
   an image sensor disposed at a bottom surface of the bobbin;

an upper elastic member and a bottom elastic member for implementing an auto focusing performance;

a connection member configured to move the bobbin in a direction perpendicular to an optical axis and connecting an interface pad and the bobbin;

a controller configured to move the bobbin to a first position at a first time point in a first direction perpendicular to the direction of the optical axis by applying a predetermined first current to the driving part such that a first displacement image is generated by the image sensor at the first position at the first time point, and then move the bobbin to a second position at a second time point in a second direction perpendicular to the direction of the optical axis by applying a predetermined second current to the driving part such that a second displacement image is generated by the image sensor at the second position at the second time point, wherein the optical axis direction that is perpendicular to the image sensor remains stationary while the bobbin moves from the first position to the second position that is different from the first position, the first time point being different from the second time point; and wherein the second direction is a direction opposite to the first direction, a generation part configured to generate a 3D image from the first displacement image generated by moving the bobbin to the first position at the first time point and the second displacement image generated by moving the bobbin to the second position at the second time point.

2. The camera module of claim 1, wherein the controller stores a predetermined magnitude of the first current and a predetermined magnitude of the second current.

3. The camera module of claim 1, wherein the controller determines the magnitudes of the first and second currents based on a distance between a photographed subject and the lens.

4. The camera module of claim 1, wherein a moving distance of the bobbin is determined by magnitudes of the first and second currents.

5. The camera module of claim 1, wherein the driving part is a coil block disposed at a periphery of the bobbin.

6. A mobile terminal comprising the camera module of claim 1.

7. The mobile terminal of claim 6, wherein the controller determines a first direction and a second direction of the bobbin by ascertaining a direction of the mobile terminal.

8. The camera module of claim 1, wherein the first direction is left and the second direction is right.

9. The camera module of claim 1, wherein the first direction is right and the second direction is left.

* * * * *